United States Patent
Tasselli

(10) Patent No.: US 9,666,910 B2
(45) Date of Patent: May 30, 2017

(54) SYSTEM AND METHOD FOR CONTROLLING A THERMOSTATIC VALVE FOR AN ELECTROCHEMICAL POWER SOURCE FOR USE IN A MARINE ENVIRONMENT

(71) Applicant: WHITEHEAD SISTEMI SUBACQUEI S.p.A, Rome (IT)

(72) Inventor: William Tasselli, Pisa (IT)

(73) Assignee: WHITEHEAD SISTEMI SUBACQUEI S.P.A., Rome (IT)

( * ) Notice: Subject to any disclaimer, the term of this patent is extended or adjusted under 35 U.S.C. 154(b) by 68 days.

(21) Appl. No.: 14/581,185

(22) Filed: Dec. 23, 2014

(65) Prior Publication Data

US 2015/0270581 A1 Sep. 24, 2015

(30) Foreign Application Priority Data

Dec. 23, 2013 (IT) .............................. TO2013A1066

(51) Int. Cl.
*H01M 6/34* (2006.01)
*H01M 10/42* (2006.01)
(Continued)

(52) U.S. Cl.
CPC .... *H01M 10/4214* (2013.01); *G05D 23/1393* (2013.01); *H01M 2/40* (2013.01);
(Continued)

(58) Field of Classification Search
CPC ......... H01M 10/4214; H01M 10/6567; H01M 6/34; H01M 2220/20; G05D 23/1393
See application file for complete search history.

(56) References Cited

U.S. PATENT DOCUMENTS

| 5,944,255 A | 8/1999 | Shirmohamadi |
| 2002/0007806 A1 | 1/2002 | Chamot |
| 2007/0105460 A1 | 5/2007 | Vivien |

FOREIGN PATENT DOCUMENTS

| DE | 19637610 | 3/1998 |
| WO | 2007103184 A2 | 9/2007 |

OTHER PUBLICATIONS

Italian Search Report dated Sep. 26, 2014 corresponding to ITTO20131066; 8 pages.

*Primary Examiner* — Ula C Ruddock
*Assistant Examiner* — Thomas Parsons
(74) *Attorney, Agent, or Firm* — Ohlandt, Greeley, Ruggiero & Perle, LLP

(57) ABSTRACT

A system for controlling, in a marine environment, a thermostatic valve coupled to an electrochemical type of electric power source, the thermostatic valve being provided with: a valve body; a first fluid inlet receiving a hot electrolytic fluid; a second fluid inlet receiving a cold electrolytic fluid; an outlet providing a mixed electrolytic fluid, resulting from mixing the hot and cold electrolytic fluids; and an adjusting element, which may be controlled to regulate the mixing. A control unit receives a reference temperature signal, variable over time, and a temperature measurement signal from a temperature sensor connected to the outlet of the thermostatic valve; and executes a control algorithm implementing fuzzy logic for generating a control signal for the adjusting element, as a function of the reference temperature signal, to reduce an error between the temperature measurement signal and the reference temperature signal.

15 Claims, 4 Drawing Sheets

(51) Int. Cl.
*G05D 23/13* (2006.01)
*H01M 2/40* (2006.01)
*H01M 6/50* (2006.01)
*H01M 10/6567* (2014.01)
*B63G 8/08* (2006.01)

(52) U.S. Cl.
CPC ............ *H01M 6/34* (2013.01); *H01M 6/5038* (2013.01); *H01M 10/6567* (2015.04); *B63G 8/08* (2013.01); *H01M 2220/20* (2013.01)

| e(t)<br>D(e(t)) | NB | NM | NS | ZE | PS | PM | PB |
|---|---|---|---|---|---|---|---|
| NB | NB | NB | NM | NM | NM | NS | ZE |
| NM | NB | NM | NM | NS | NS | ZE | PS |
| NS | NM | NS | NS | NS | ZE | PS | PM |
| ZE | NM | NS | NS | ZE | PS | PS | PM |
| PS | NM | NS | ZE | PS | PS | PS | PM |
| PM | NS | ZE | PS | PS | PM | PM | PB |
| PB | ZE | PS | PM | PM | PM | PB | PB |

SYSTEM AND METHOD FOR CONTROLLING A THERMOSTATIC VALVE FOR AN ELECTROCHEMICAL POWER SOURCE FOR USE IN A MARINE ENVIRONMENT

The present invention relates to a system and method for controlling a thermostatic valve for an electrochemical power source for use in a marine environment; in particular, the following description shall refer, without any loss of generality, to a utilization of this control system and method in an underwater vehicle, for example in a torpedo.

BACKGROUND OF THE INVENTION

In a known manner, an electrochemical power source (a so-called "electrochemical battery") comprises an electrochemical stack, constituted by at least two electrodes, made of a metal material for example, with different electronegative potentials, and in which a suitable electrolytic fluid is made to circulate.

This electrolytic fluid undergoes an increase in temperature when it is inside the electrochemical stack, due to the exothermicity of the chemical reactions that take place inside the same electrochemical stack.

As a rule, the electrolytic fluid has to be extracted from the electrochemical stack and cooled by suitable cooling systems, to avoid unsustainable heat drift in the system, and then put back into the electrochemical stack again.

Control of the temperature of the electrolytic fluid introduced into the electrochemical battery is an important parameter for correct operation of the power source, especially in those batteries where performance is affected by following factors:

- leakage currents, i.e. leak electric currents that circulate inside the battery between the electrodes, which become electrically connected by the electrolytic fluid; and
- internal resistance (also defined as series resistance) of the electrochemical stack.

Both of these factors are affected by the temperature of the electrolytic fluid; in particular, as the temperature rises, the electric resistance of the electrolytic fluid drops and leakage currents rise, while the series resistance inside the stack drops.

Theoretical and experimental research has also revealed that the optimal working temperature depends on the power supplied by the electrochemical battery.

In particular, when low power is requested (i.e. the component linked to series resistance is low), the temperature of the electrolytic fluid can be advantageously reduced to limit internal leakage currents, which are more penalising for the system in these conditions.

Vice versa, when high power is requested, the temperature can be advantageously raised to reduce the series resistance of the electrochemical stack.

To enable adjustment of the temperature of the electrochemical fluid, it has been proposed to use a control system that comprises a heat exchanger, two tanks designed to contain electrolytic fluid and a thermostatic valve.

In particular, hot electrolytic fluid is taken from the electrochemical stack and transferred to a first tank, while a second tank contains cold electrolytic fluid, obtained by cooling hot electrolytic fluid that is made to flow through the heat exchanger.

The thermostatic valve has a first and a second inlet, respectively connected to the first and the second tank, an outlet connected to a fluid inlet of the electrochemical stack, and control means that can be operated to control the mixing of hot electrolytic fluid and cold electrolytic fluid to be fed to the electrochemical stack, to adjust the temperature of the mixed electrolytic fluid.

However, until now, no entirely satisfactory control systems exist for adjusting the temperature of the electrolytic fluid that is reintroduced into the electrochemical stack.

In particular, inside underwater vehicles, such as torpedoes, this temperature is generally set to a fixed, predetermined value.

SUMMARY OF THE INVENTION

The object of the present invention is to provide a control solution that allows overcoming, entirely or at least partially, the problems and limitations associated with the known solutions.

Thus, according to the present invention, a control device and a control method are provided, as defined in the appended claims.

BRIEF DESCRIPTION OF THE DRAWINGS

For a better understanding of the present invention, some preferred embodiments will now be described, purely by way of non-limitative example and with reference to the accompanying drawings, wherein.

DETAILED DESCRIPTION OF THE INVENTION

The Applicant has realized that regulation of the temperature of the electrolytic fluid that is reintroduced into an electrochemical battery is of significant complexity, especially when the system is used in a marine environment, or rather when one or more of the following conditions occur:

- the electrochemical battery is used inside an underwater vehicle;
- the heat exchanger uses seawater as the source of cold;
- the heat exchanger uses an outer surface of the underwater vehicle in contact with seawater as a heat-exchange surface;
- the system uses the generated electric power to power an electric motor for propelling the underwater vehicle, which, by varying the speed of the vehicle, also alters the exchange coefficients of the heat exchanger.

In general, the Applicant has established that in this case, the system has numerous non-linear characteristics and that, as a consequence, the use of traditional control devices and methods, for example of the PID (Proportional-Integrative- Derivative) type, is hindered in a correct definition/modeling of the transfer functions of the various blocks that constitute the system.

Figure 1:
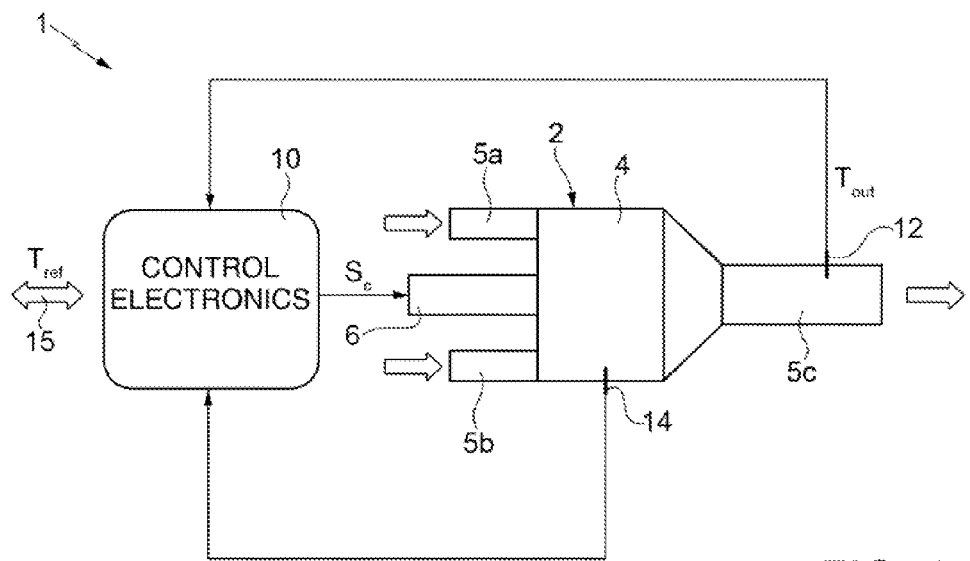
FIG. 1 is a simplified block diagram of a control system of a thermostatic valve for an electrochemical power source, according to one embodiment of the present invention.

A control system will now be described with reference to FIG. 1, where it is indicated as a whole by reference numeral 1, for controlling a thermostatic valve 2, in particular for use in a marine environment, for example, an underwater environment.

In particular, the thermostatic valve 2 comprises a valve body and has: a first fluid inlet 5a, for introducing electrolytic fluid at a first, so-called "hot" temperature; a second fluid inlet 5b, for introducing electrolytic fluid at a second, so-called "cold" temperature, lower that the first temperature; and a fluid outlet 5c, from which mixed electrolytic fluid is supplied at a third temperature, regulated at a desired level.

As will be shown in greater detail below, the fluid outlet 5c is connected to a fluid inlet of an electrochemical stack of a power source (electrochemical battery), for example, of an underwater vehicle.

In addition, the first fluid inlet 5a can be connected to the electrochemical stack to receive hot electrolytic fluid, which is generated following exothermic chemical reactions and which is extracted from the electrochemical stack; and the second fluid inlet 5b can be connected to a heat exchanger that cools the electrolytic fluid leaving the electrochemical stack.

The thermostatic valve 2 further comprises an actuator 6, for example, including or cooperating with an electric motor (not shown) and, in a manner not shown here, control means operated by the actuator 6 to adjust the mixing of the hot and cold electrolytic fluids and thereby adjust the temperature of the electrolytic fluid provided at the fluid outlet 5c.

For example, the control means may comprise a movable part (hereinafter separator), operated by the actuator 6, for example with a rotational movement, to modify a respective opening inside the valve body 4 for the hot and cold electrolytic fluids, so as to alter the output mixture.

The control system 1 further comprises: an electronic control module 10, comprising a processing unit based on a microcontroller (or microprocessor, DSP—Digital Signal Processor, or similar digital processing unit), configured to provide a control signal $S_c$ to the actuator 6 of the thermostatic valve 2, so as achieve a desired regulation of the electrolytic fluid at the fluid outlet 5c; a temperature sensor 12, for example a thermocouple, coupled to the fluid outlet 5c to detect the output temperature $T_{out}$ of the electrolytic fluid resulting from the mixing performed by the thermostatic valve 2 and provide an output temperature signal $T_{out}(t)$, variable over time; and a position sensor 14, connected to the control means of the electrostatic valve 2, to detect a position (for example, the rotational position of the aforementioned movable separator).

The electronic control module 10 also receives at the input, for example via a digital interface, such as a data communication bus 15, for example a CAN (Controller Area Network) bus, a reference temperature signal $T_{ref}(t)$, variable over time. The reference temperature signal $T_{ref}(t)$ represents, moment by moment, a target value for the aforementioned output temperature $T_{out}$ and/or a value of a quantity associated with this reference temperature $T_{ref}$ (for example, a desired electric power level that must be provided by the electrochemical power source).

The aforementioned reference temperature value $T_{ref}$ is, for example, generated by a main electronic control unit (not shown here) of the underwater vehicle in which the thermostatic valve 2 is used, for example, on the basis of a desired power level that has to be provided by the related power source.

The electronic control module 10 is configured to adjust mixing of the hot and cold electrolytic fluids by generating the control signal $S_c$ with a suitable value based on the difference between the value of the output temperature $T_{out}$ detected by the temperature sensor 12 and the optimal one received at the input, i.e. the reference temperature value $T_{ref}$.

When analysing the system, as has already been pointed out, it is possible to discover numerous non-linear aspects.

For example, the output temperature $T_{out}$ of the mixed electrolytic fluid is not a linear function of the displacement (for example, by rotation) of the control means of the electrostatic valve 2; it is sufficient to consider the fact that the temperature of the cold electrolytic fluid contained inside the heat exchanger is linked to the time needed for internally traversing the heat exchanger, which, however, is in turn influenced by the position of the control means of the electrostatic valve 2.

According to one particular aspect of the present invention, the electronic control module 10 is therefore configured to implement fuzzy control logic, in order to achieve effective control of the output temperature $T_{out}$ of the electrolytic fluid, advantageously also in non-linear conditions, such as those associated with the use in a marine environment, in particular in an underwater vehicle.

Figure 2:
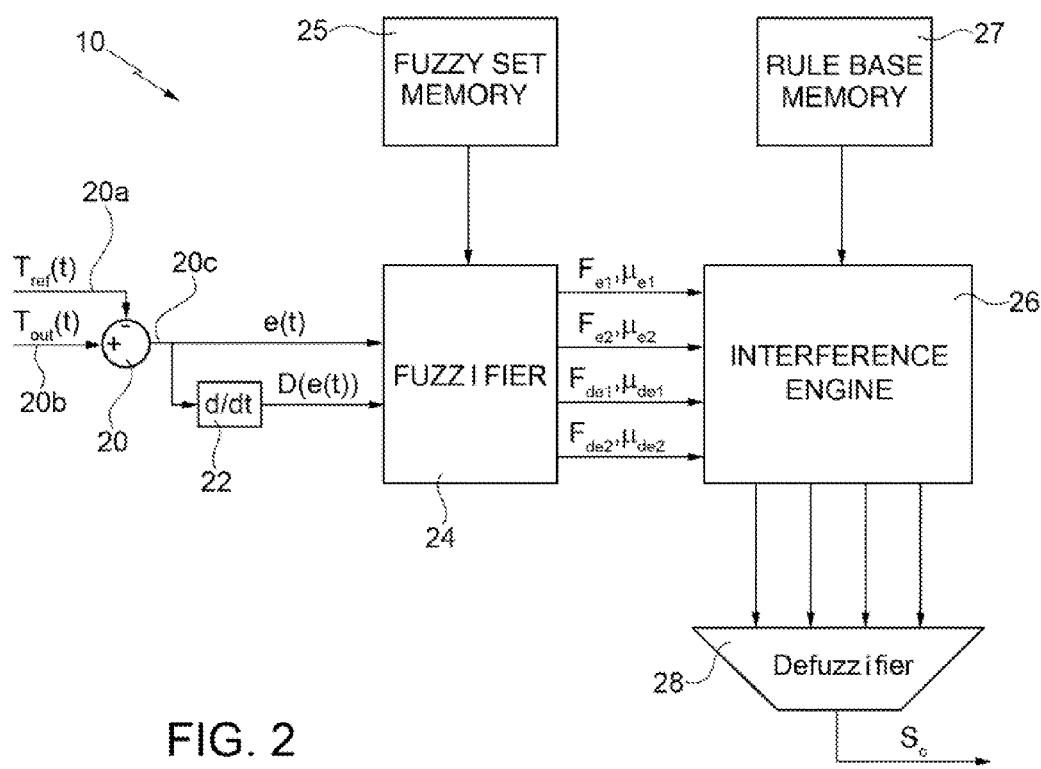
FIG. 2 is a simplified block diagram of an electronic control module of the system in FIG. 1.

In detail, and as shown in FIG. 2, the electronic control module 10 comprises a subtractor stage 20 and a differentiator stage 22.

The subtractor stage 20 has a first input 20a designed to receive the reference temperature signal $T_{ref}(t)$, a second input 20b designed to receive the output temperature signal $T_{out}(t)$, and an output 20c designed to provide an error signal e(t), resulting from the difference between the value of the output temperature signal $T_{out}(t)$ and the value of the reference temperature signal $T_{ref}(t)$:

$$e(t)=T_{out}(t)-T_{ref}(t).$$

The differentiator stage 22 is connected to the output 20c, so as to receive the error signal e(t), and is configured to execute a time derivative operation on the error signal e(t) to generate an error derivative signal D(e(t)).

The electronic control module 10 further comprises a "fuzzifier" stage 24, which receives as an input the point values (so-called crisp values) of the error signal e(t) from the subtractor stage 20 and of the error derivative signal D(e(t)) from the differentiator stage 22, and implements a fuzzification operation on these values, i.e. provides a fuzzy-language description of the input values.

To this end, the fuzzifier stage 24 is connected to a first memory 25, which contains fuzzy sets for performing the fuzzification operation on the values of the error signal e(t) and the error derivative signal D(e(t)).

The fuzzification operation contemplates associating a degree of membership to each point value of an input variable with one or more previously defined fuzzy sets (this degree of membership usually taking a value in the range between 0 and 1, or, similarly, between 0% and 100%), by means of a membership function. Although the range of values between 0 and 1 is one of the most commonly used for representing the degree of membership, any arbitrary set with a complete or partial natural order can nevertheless be used.

Therefore, starting from a given value of the input variable, the fuzzification operation returns a set of ordered pairs as output, each constituted by an identified fuzzy set and by a degree of membership to that fuzzy set, determined by the membership function.

In one possible embodiment of the present invention, the fuzzy sets used for the fuzzification operation are the following:

NB—"Negative Big": corresponds to a large negative value of the input variable, i.e. of the error signal e(t) or the error derivative signal D(e(t));

NM—"Negative Medium": corresponds to a medium negative value of the input variable;

NS—"Negative Small": corresponds to a small negative value of the input variable;

ZE—"Zero": corresponds to a substantially null value, or in any case one that does not diverge from a null value by more than a certain interval, of the input variable;

PB—"Positive Big": corresponds to a large positive value of the input variable;

PM—"Positive Medium": corresponds to a medium positive value of the input variable; and PS—"Positive Small": corresponds to a small positive value of the input variable.

Figures 3, 4:
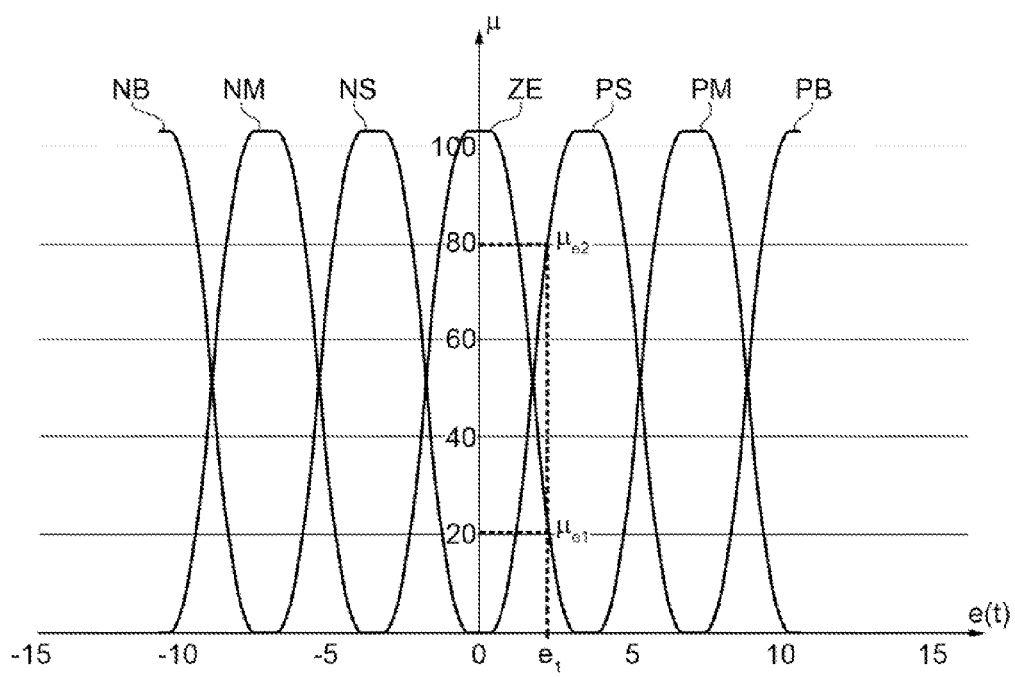
FIG. 3 shows the fuzzy set patterns of an input variable, associated with the electronic control module in FIG. 2.
FIG. 4 shows a table comprising values of a "Rule base" associated with the electronic control module in FIG. 2.

The membership functions for the aforementioned fuzzy sets are illustrated in FIG. 3 (with regard to the error signal e(t), but entirely similar considerations are applicable to the error derivative signal D(e(t))); each of these functions has a "bell curve" pattern centred around a respective value of the input variable, in this case, the error signal e(t).

The membership values for each of the fuzzy sets, defined by the aforementioned functions, are mapped in the first memory 25, for every possible value of the input variables e(t) and D(E(t)).

In particular, the membership functions of the fuzzy sets are defined in such a way that, for each value of the input variable e(t) and D(E(t)) only two simultaneously active fuzzy sets exist.

As shown by the example in FIG. 3, for a generic value $e_1$ of the error signal e(t) (but it is underlined that entirely similar considerations are applicable to the error derivative signal D(e(t))), there are two corresponding degrees of membership to two corresponding fuzzy sets. In the example: a first membership value $\mu_{e1}$ to a first fuzzy set $F_{e1}$, in this case ZE, equal to 0.2 or 20%, and a second membership value $\mu_{e2}$ to a second fuzzy set $F_{e2}$, in this case PS, equal to 0.8 or 80%. In other words, the value $e_1$ of the error signal e(t) belongs to fuzzy set ZE with a 20% degree of membership and to fuzzy set PS with an 80% degree of membership.

In particular, in the embodiment shown, the fuzzy sets are configured in such a way that the sum of the aforementioned two degrees of membership ($\mu_{e1}$ and $\mu_{e2}$ in the example) is equal to 1, or 100%.

Therefore, for each value of the input variables, e(t) and D(E(t)), the fuzzifier stage 24 provides at the output the identifier of two selected fuzzy sets and the related degrees of membership, namely the following pairs: $F_{e1}, \mu_{e1}$; $F_{e2}, \mu_{e2}$ for the error signal e(t); and the following pairs: $F_{de1}, \mu_{de1}$; $F_{de2}, \mu_{de2}$ for the error derivative signal D(e(t)).

The electronic control module 10 further comprises a processing stage 26 that implements the so-called Fuzzy Inference Engine, i.e. it is configured to determine the identifiers of the fuzzy sets of the output variable and the related degrees of membership, starting from the identifiers of the fuzzy sets selected at the input and the related degrees of membership, on the basis of certain predetermined selection rules.

These selection rules are encoded in the so-called Rule Base, which is stored in a second memory 27, operatively connected to the processing stage 26.

The output variable in question is, in this case, the value of the control signal $S_c(t)$ that is to be supplied to the actuator 6 of the thermostatic valve 2. In one embodiment, this control signal $S_c$ determines a desired degree of rotation of the movable separator operated by the aforementioned actuator 6.

In particular, for determining the fuzzy sets of the output variable, $S_c(t)$, the processing stage 26 is configured to jointly consider the fuzzy values of both input variables, e(t) and D(e(t)), which, as previously discussed, depend on the point (i.e. moment by moment) values of the error signal e(t) and the error derivative signal D(e(t)).

FIG. 4 summarizes, in tabular form, a possible embodiment of the selection rules for determining the fuzzy sets of the output variable; as it may be noted, the identifiers of the possible fuzzy sets of the output variable correspond to those considered for the input variables: "NB", "NM", "NS", "ZE", "PS", "PM" and "PB".

In particular, the table summarizes the aforementioned selection rules, indicating, for each entry at the intersection of the rows (which correspond to the fuzzy sets of the error derivative signal D(e(t))) and the columns (which correspond to the fuzzy sets of the error signal e(t)), the resulting fuzzy set for the output variable $S_c(t)$.

Figure 5:
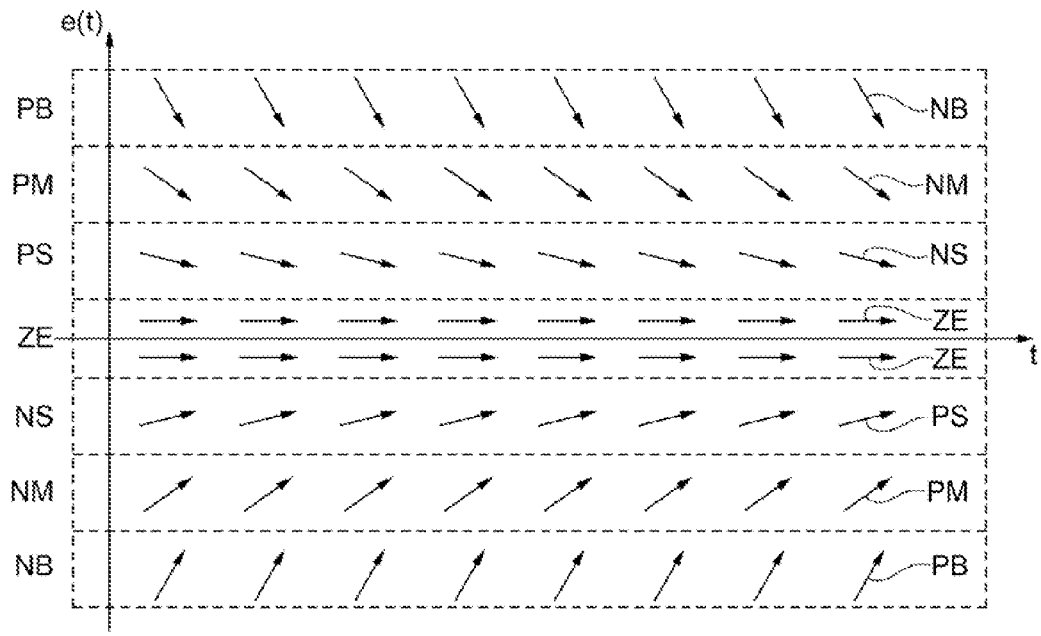
FIG. 5 is a schematic representation of quantities associated with the electronic control module in FIG. 2.

In general, the criteria applied by the aforementioned selection rules can be better understood from analysis of the diagram in FIG. 5.

For each membership band of the error signal e(t), i.e. for each fuzzy set associated with it, a desired slope is defined (shown by the inclination of the corresponding arrow in the aforementioned FIG. 5), gradually decreasing in modulus as the same error signal e(t), in turn, assumes decreasing values, approaching the band corresponding to fuzzy set ZE. This slope corresponds to the error derivative signal D(e(t)) being a member of a corresponding fuzzy set, as illustrated in FIG. 5.

Therefore, the processing stage 26 operates to generate suitable corrective actions so as to bring the derivate of the error signal D(e(t)) to the desired slope, depending on the band within which the values of the error signal e(t) being processed each time fall.

If, for example, the error signal e(t) is in the "NS" band (i.e. the instantaneous value of the error signal e(t) is associated with fuzzy set NS), but its slope (determined by the error derivative signal D(e(t)) is "PB", the processing stage 26 operates to generate a control signal $S_c(t)$ to slightly modify the configuration of the thermostatic valve 2, such that a smaller quantity of hot electrolytic fluid is made to flow to the fluid outlet 5c (in this specific case, by selecting the "PM" fuzzy set for the output variable). In this way, the slope of the error signal e(t) may progressively return to the desired value (in this case, a small positive value, "PS").

Instead, if the error signal e(t) is in the same band, "NS", but its slope is close to that desired, this being "PM" for example, the processing stage 26 performs a small correction (by selecting the "PS" fuzzy set for the output variable).

Accordingly, if the error signal e(t) is in the same band, "NS", but its slope is already that desired, "PS", the processing stage 26 does not perform any significant correction (by selecting the "ZE" fuzzy set for the output variable).

As a further example, in the case where, with the error signal e(t) in the aforementioned "NS" band, the slope is negative, for example "NS", the processing stage 26 operates to generate a control signal $S_c(t)$ to modify the configuration of the thermostatic valve 2 in the other direction, such that a larger quantity of hot electrolytic fluid is made to flow to the fluid outlet 5c (in this specific case, by selecting the "NS" fuzzy set for the output variable). In this way, the slope of the error signal e(t) may again progressively return to the desired value, "PS".

Furthermore, the degree of membership of the output variable $S_c(t)$ to each fuzzy set is determined with the law of the minimum. In other words, the degree of membership of the output fuzzy set is the minimum of the two degrees of membership of the input variables e(t) and D(E(t)), from which the same output fuzzy set is derived.

For example, if the "NB" output fuzzy set is derived from the pair (NB, 0.2) for signal e(t), and the pair (NB, 0.3) for signal D(E(t)), then the degree of membership of the output signal $S_c(t)$ to the "NB" fuzzy set is equal to 0.2 (i.e. the minimum of the aforementioned degrees of membership 0.2 and 0.3).

The electronic control module 10 further comprises a defuzzifier stage 28, which implements the "defuzzification" of the output variable $S_c(t)$, providing point values (so-called crisp values), as a function of the fuzzy sets identified by the processing stage 26 and the related degrees of membership.

Figure 6:
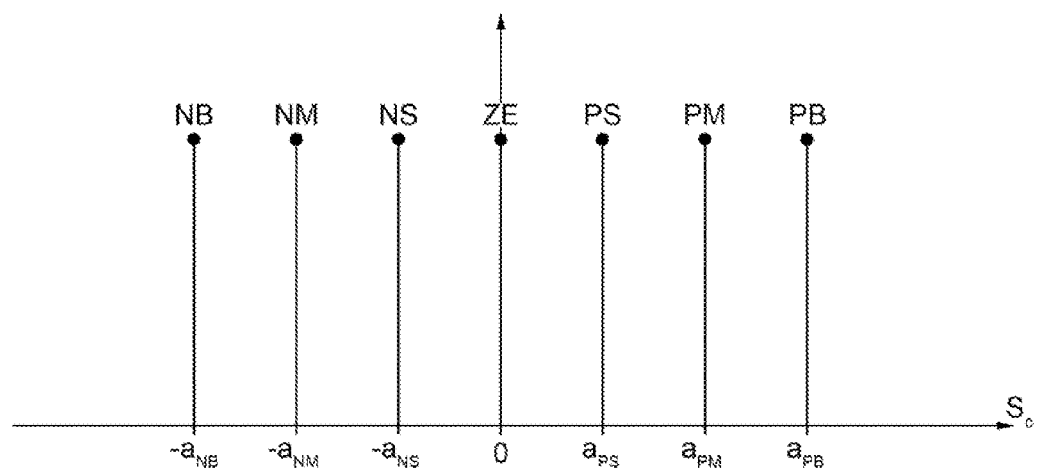
FIG. 6 shows the fuzzy set patterns of an output variable, associated with the electronic control module in FIG. 2.

As shown in FIG. 6, in one possible embodiment, the membership functions of the fuzzy sets associated with the output variable $S_c(t)$ are represented by respective deltas, centred on values (indicated by $-a_{NB}$, $-a_{NM}$, $-a_{NS}$, 0, $a_{PS}$, $a_{PM}$ and $a_{PB}$), which are, for example, evenly spaced apart in the range of values that the output variable $S_c(t)$ may assume.

For example, in the case where the output variable $S_c(t)$ is associated with a rotation of the movable separator of the thermostatic valve 2 operated by the actuator 6, the aforementioned point values may correspond to desired angles of rotation of the movable separator. For example, these values could be the following: −1.56, −1.04, −0.52, 0, 0.52, 1.04 and 1.56, measured in rad/s.

These membership functions for the fuzzy sets of the output variable $S_c(t)$ have the advantage of simplifying the algorithm for calculating the point values of the output variable $S_c(t)$; in one embodiment, this algorithm may be reduced to calculating a weighted average.

For example, in the case where the two fuzzy sets identified by the processing stage 26 are represented by the pairs (NS, 0.1) and (PM, 0.2), the point value of the output variable, $S_c$, can be determined by the following weighted average:

$$S_c = \frac{-a_{NS} \cdot 0.1 + a_{PM} \cdot 0.2}{(0.1 + 0.2)}$$

In general, given the pairs $(F_i, \mu_i)$ and $(F_j, \mu_j)$ identified by the processing stage 26, the above-indicated expression becomes:

$$S_c = \frac{a_{Fi} \cdot \mu_i + a_{Fj} \cdot \mu_j}{(\mu_i + \mu_j)}$$

The so determined values for the output variable, i.e. the control signal $S_c$, are then sent from the electronic control module 10 to the actuator 6 of the thermostatic valve 2, to adjust the output temperature $T_{out}$ of the electrolytic fluid that is fed to the inlet of the electrochemical stack.

The previously described fuzzy control algorithm then provides for evaluating the entity of the error between the value of the output temperature signal $T_{out}(t)$ and the value of the reference temperature signal $T_{ref}(t)$, associating a membership band centred around zero (which represents the ideal condition, with no errors) with this error.

In addition, this control algorithm provides for associating a desired slope (or variation) for the error e(t) (represented by the error derivative signal D(e(t)) with each membership band, and ensuring, through proper adjustment of the opening configuration of the thermostatic valve 2, that the measured variation (or slope) of the error approaches the desired one.

The objective of the control algorithm is generally that of rapidly cancelling the error e(t), to bring the output temperature $T_{out}$ of the electrolytic fluid to the desired value, by promptly reacting to changes in the operating conditions.

Figure 7:
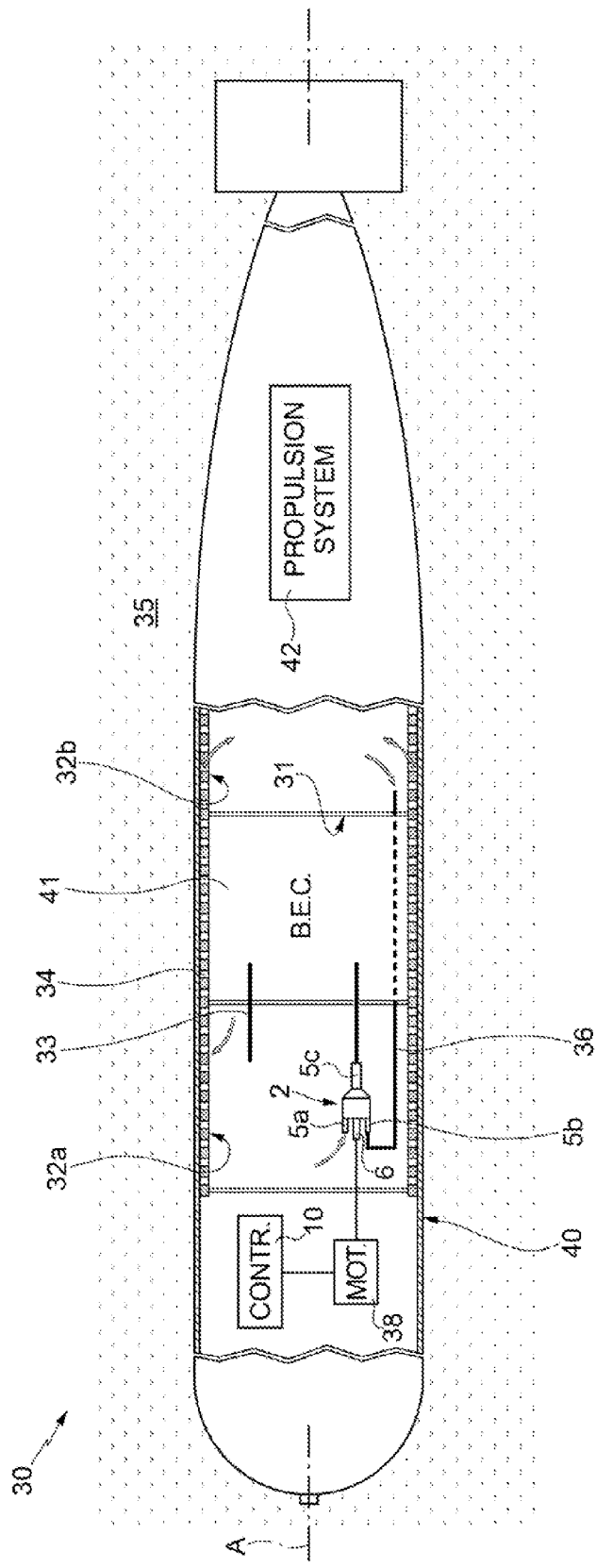
FIG. 7 is a schematic representation of an underwater vehicle, in particular a torpedo, in which the control system in FIG. 1 is used.

As previously indicated, the described invention may find advantageous application inside an underwater vehicle, for example a torpedo, as schematically shown in FIG. 7.

The underwater vehicle, indicated by reference numeral 30, comprises a tubular body, having an axis of longitudinal extension A and a central section (shown in FIG. 7) inside which a chamber 31 is defined, housing an electrochemical stack 41, in this case designed to provide an electric power supply to a motor, for propulsion of the underwater vehicle 30 (schematically indicated by reference numeral 42) and/or to onboard control equipment (not shown). In particular, the electrochemical stack 41, in a manner in itself known, during operation is designed to be filled with seawater, acting as an electrolytic fluid.

The central section has a first tank 32a positioned next to the chamber 31 (in front of the chamber 31 with respect to the longitudinal axis A) and a second tank 32b (rearward of the chamber 31 with respect to the longitudinal axis A), designed to contain hot electrolytic fluid and cold electrolytic fluid, respectively.

In particular, a pipe 33 places, at least in certain operating conditions, the first tank 32a in communication with the chamber 31, in such a way that hot electrolytic fluid taken from inside the electrochemical stack enters into the first tank 32a. Part of this hot electrolytic fluid is also opportunely conveyed to a heat exchanger 34, which is constituted by an interspace made inside the central section of the underwater vehicle 30 and having an outer wall directly in contact with seawater, indicated by reference numeral 35. After being cooled by the heat exchanger 34, the electrolytic fluid reaches the second tank 32b.

In the embodiment shown, the thermostatic valve 2 is inside the first tank 32a, immersed in hot electrolytic fluid. Therefore, the first fluid inlet 5a is constituted by an aperture in direct fluid communication with the first tank 32a; the second fluid inlet 5b is instead fluidly connected to the second tank 32b by an inlet pipe 36, which places the second tank 32b in communication with the first tank 32a; while the fluid outlet 5c of the thermostatic valve 2 is fluidly connected to an inlet of the electrochemical stack, to feed the mixed electrolytic fluid, at a desired temperature, which is reintroduced into the electrochemical stack.

In addition, an electric motor 38, controlled by the electronic control module 10, drives the actuator 6 of the electrostatic valve 2, for example driving its rotation around a rotation shaft.

In the embodiment shown, the electronic control module 10 and the electric motor 38 are arranged outside the first chamber 30a, in a so-called "dry" zone.

The control algorithm, according to the fuzzy logic previously described in detail, is advantageously implemented as a firmware in the electronic control module 10, in particular in the associated microcontroller (which therefore stores suitable software instructions and procedures).

The described invention thus provides an electric power source for use in a marine environment, for example for the underwater vehicle 30, comprising in particular: the electrochemical stack 41, the thermostatic valve 2, the electronic control module 10 and the associated electric motor 38.

The advantages of the described solution are clear from the foregoing description.

In particular, it should again be underlined that this solution enables achieving efficient electronic regulation of the temperature of the electrolytic fluid entering an electrochemical power source, even in highly non-linear situations, and, in particular, enables electronically varying the target (or so-called "set point") temperature for which this regulation is to be performed.

The variation of the target regulating temperature enables optimizing performance of the electrochemical power source under dynamic conditions during operation, for example based on the amount of power required each time by the operating conditions.

The control solution does not even require accurate modeling of the system and the associated transfer functions for coping with the non-linear aspects of the system, and furthermore does not require complex processing operations.

In addition, it is possible to alter the behavior of the control system in a simple and rapid manner, by acting on the rules and laws of the fuzzy control logic, suitably encoded in memory, without hardware changes being required.

This modification may also be implemented via a digital control interface, to adapt to changes in operating conditions in real-time.

The described solution may also be advantageously implemented in microcontrollers (or similar digital processing units) with limited processing capabilities, for example in 8-bit microcontrollers. As well as representing an economic advantage, in terms of cost savings, this characteristic enables increasing the safety performance of the system (given that, in general, simpler microcontrollers have greater reliability and sturdiness).

Finally, it is evident that modifications and variations can be made to what disclosed herein without departing from the scope of the present invention, as defined in the appended claims.

In particular, it is underlined again that the present solution is advantageously applicable for controlling a generic thermostatic valve for use in a marine environment, for example inside a generic underwater vehicle, which can also differ from the previously illustrated torpedo and, for example, be an underwater probe or a sounder.

Furthermore, it is evident that the implementation details of the previously described control algorithm can vary, for example with regard to the pattern of the membership functions of the fuzzy sets or the rules applied, according to the specific control requirements of the system in which the solution is embodied.

The invention claimed is:

1. A system for controlling, in a marine environment, a thermostatic valve coupled with an electric power source of electrochemical type, said thermostatic valve having: a valve body; a first fluid inlet designed to receive an electrolytic fluid at a first temperature; a second fluid inlet designed to receive an electrolytic fluid at a second temperature lower than the first temperature; an outlet designed to provide a mixed electrolytic fluid resulting from mixing of the electrolytic fluids at the first and second temperatures; and an adjusting element that can be controlled to regulate said mixing, the system comprising:
   a control unit programmed to:
   receive a reference temperature signal, variable over time, and a temperature measurement signal from a temperature sensor coupled to the outlet of said thermostatic valve;
   execute a control algorithm implementing fuzzy logic for generating a control signal for said adjusting element, as a function of the reference temperature signal, to reduce an error between the temperature measurement signal and the reference temperature signal,
   wherein said control unit is programmed to implement: a subtractor stage, designed to generate an error signal as a function of the difference between the temperature measurement signal and the reference temperature signal; and a differentiator stage, designed to determine an error derivative signal as a function of said error signal, wherein said control algorithm is configured to jointly process said error signal and said error derivative signal to determine said control signal.

2. The system as claimed in claim 1, wherein said control unit is programmed to implement:
   a "fuzzifier" stage, designed to receive at input point values of the error signal from the subtractor stage and of the error derivative signal from the differentiator stage and to implement an operation of fuzzification on said value for description of the input values in a fuzzy language, based on pre-determined fuzzy input sets; a processing stage designed to determine fuzzy output sets for the control signal, starting from the pre-determined fuzzy input sets selected by the fuzzifier stage, based on preset determination rules; and
   a defuzzifier stage designed to provide point values of the control signal, as a function of the fuzzy output sets determined by the processing stage.

3. The system as claimed in claim 2, wherein the pre-determined fuzzy input sets represent respective amplitude intervals, positive and negative, of the error signal and the error derivative signal; and wherein said preset determination rules are designed to associate a desired derivative of the error signal with each of said respective amplitude intervals of the error signal, so as to bring said error signal to a value near to zero; and wherein said processing stage is configured to determine said fuzzy output sets for the control signal, so that the relative amplitude interval of the error derivative signal corresponds to said desired derivative.

4. The system as claimed in claim 2, wherein said control unit comprises a first memory designed to store characteristics of said pre-determined fuzzy input sets, and a second memory designed to store data associated with said preset determination rules.

5. The system as claimed in claim 2, wherein membership functions, each having a "bell curve" pattern centered around a respective input value of the error signal and of the error derivative signal, are associated with said pre-determined fuzzy input sets, and
   wherein said membership functions of the pre-determined fuzzy input sets are defined so that, for each respective input value, there are two corresponding fuzzy sets, having respective degrees of membership, the sum of which provides a unit value.

6. The system as claimed in claim 5, wherein the preset determination rules implemented by said processing stage are designed to associate with each pair, formed of a first fuzzy input set of the error signal and a second fuzzy input set of the error derivative signal, a respective fuzzy output set, having a respective membership function determined by the membership functions of the first and second fuzzy input sets, and a degree of membership equal to the minimum of membership degrees of the first and second fuzzy input sets.

7. The system as claimed in claim 6, wherein said membership functions each having a "delta" pattern, centered around a respective output value of the control signal are associated with said fuzzy output sets.

8. The system as claimed in claim 7, wherein said defuzzifier stage is designed to determine the point values of the control signal by means of the following weighted average:

$$S_c = \frac{a_{Fi} \cdot \mu_i + a_{Fj} \cdot \mu_j}{(\mu_i + \mu_j)}$$

where $a_{Fi}$ and $a_{Fj}$ the output values associated with the pair of fuzzy output sets $F_i$ and $F_j$, and $\mu_i$ and $\mu_j$ are the respective degrees of membership and $S_c$ is the control signal.

9. The system as claimed in claim 1, wherein said control unit has a digital input interface designed to receive said reference temperature signal via a digital communication bus.

10. An electrochemical type electric power source, for use in a marine environment, comprising: a thermostatic valve; an electrochemical stack operatively coupled with the thermostatic valve; and a control system for the thermostatic valve having the thermostatic valve coupled with an electric power source of electrochemical type, the thermostatic valve having: a valve body; a first fluid inlet designed to receive an electrolytic fluid at a first temperature; a second fluid inlet designed to receive an electrolytic fluid at a second temperature lower than the first temperature; an outlet designed to provide a mixed electrolytic fluid that results from mixing of the electrolytic fluids at the first and second temperatures; and an adjusting element that can be controlled to regulate said mixing, the system comprising:
a control unit programmed to:
receive a reference temperature signal, variable over time, and a temperature measurement signal from a temperature sensor coupled to the outlet of said thermostatic valve;
execute a control algorithm implementing fuzzy logic for generating a control signal for said adjusting element, as a function of the reference temperature signal, to reduce an error between the temperature measurement signal and the reference temperature signal, wherein said control unit is programmed to implement: a subtractor stage designed to generate an error signal as a function of the difference between the temperature measurement signal and the reference temperature signal, and a differentiator stage designed to determine an error derivative signal as a function of said error signal, and wherein said control algorithm is configured to jointly process said error signal and error derivative signal to determine said control signal.

11. The electric power source as claimed in claim 10, further comprising: hot electrolytic fluid supply elements for supplying hot electrolytic fluid, which flows out of said electrochemical stack, to the first fluid inlet of the thermostatic valve; and cold electrolytic fluid supply elements for supplying cold electrolytic fluid coming from a heat exchanger designed to receive said hot electrolytic fluid, to the second fluid inlet of the thermostatic valve; wherein the outlet of said thermostatic valve is coupled with a fluid inlet of said electrochemical stack.

12. An underwater vehicle, comprising an electric power source for use in a marine environment, comprising: a thermostatic valve; an electrochemical stack operatively coupled with the thermostatic valve; and a control system for the thermostatic valve having the thermostatic valve coupled with the electric power source that is of electrochemical type, said thermostatic valve having: a valve body; a first fluid inlet designed to receive an electrolytic fluid at a first temperature; a second fluid inlet designed to receive an electrolytic fluid at a second temperature lower than the first temperature; an outlet designed to provide a mixed electrolytic fluid that results from mixing of the electrolytic fluids at the first and second temperatures; and an adjusting element that can be controlled to regulate said mixing, the system comprising:
a control unit programmed to:
receive a reference temperature signal, variable over time, and a temperature measurement signal from a temperature sensor coupled to the outlet of said thermostatic valve;
execute a control algorithm implementing fuzzy logic for generating a control signal for said adjusting element, as a function of the reference temperature signal, to reduce an error between the temperature measurement signal and the reference temperature signal,
wherein said control unit is programmed to implement: a subtractor stage designed to generate an error signal as a function of the difference between the temperature measurement signal and the reference temperature signal; and a differentiator stage designed to determine an error derivative signal as a function of said error signal, and wherein said control algorithm is configured to jointly process said error signal and error derivative signal to determine said control signal.

13. The vehicle as claimed in claim 12, further comprising a tubular body, having an axis of longitudinal extension, including a central section inside which a chamber is defined, housing the electrochemical stack designed to be filled with seawater, operating as an electrolytic fluid, wherein said central section defines a first tank and a second tank designed to contain hot electrolytic fluid and cold electrolytic fluid, respectively, and wherein the first fluid inlet of the thermostatic valve is fluidly coupled with said first tank, the second fluid inlet of the thermostatic valve being fluidly coupled to the second tank, and the outlet of the thermostatic valve being fluidly coupled with a fluid inlet of said electrochemical stack.

14. The vehicle as claimed in claim 12, being a torpedo and further comprising an electric propulsion system, wherein the electric power source is configured to supply electric power to said electric propulsion system.

15. A method for controlling, in a marine environment, a thermostatic valve coupled with an electrochemical type electric power source, the thermostatic valve having: a valve body; a first fluid inlet designed to receive an electrolytic fluid at a first temperature; a second fluid inlet designed to receive an electrolytic fluid at a second temperature lower than the first temperature; an outlet designed to supply a mixed electrolytic fluid that results from mixing of the electrolytic fluids at the first and second temperatures; and an adjusting element that can be controlled to regulate said mixing, the method comprising the steps of: receiving a reference temperature signal, variable over time, and a temperature measurement signal associated with the temperature of the electrolytic fluid mixed at the outlet of said thermostatic valve; and executing a control algorithm implementing fuzzy logic to generate a control signal for said adjusting element, as a function of the reference temperature signal for reducing an error between the temperature measurement signal and the reference temperature signal; and generating an error signal as a function of the difference between the temperature measurement signal and the reference temperature signal; and generating an error derivative signal as a function of said error signal, wherein said step of executing a control algorithm comprises jointly processing said error signal and error derivative signal to determine said control signal.

\* \* \* \* \*